(12) United States Patent
Maslak

(10) Patent No.: US 10,601,770 B2
(45) Date of Patent: *Mar. 24, 2020

(54) SYSTEM AND METHOD FOR CORRELATING ROUTING PROTOCOL INFORMATION

(71) Applicant: Level 3 Communications, LLC, Broomfield, CO (US)

(72) Inventor: Joelle T. Maslak, Golden, CO (US)

(73) Assignee: Level 3 Communications, LLC, Broomfield, CO (US)

(*) Notice: Subject to any disclaimer, the term of this patent is extended or adjusted under 35 U.S.C. 154(b) by 0 days.

This patent is subject to a terminal disclaimer.

(21) Appl. No.: 16/298,741

(22) Filed: Mar. 11, 2019

(65) Prior Publication Data

US 2019/0207905 A1 Jul. 4, 2019

Related U.S. Application Data

(63) Continuation of application No. 15/099,101, filed on Apr. 14, 2016, now Pat. No. 10,230,686.

(60) Provisional application No. 62/147,884, filed on Apr. 15, 2015.

(51) Int. Cl.
*H04L 29/12* (2006.01)
*H04L 29/08* (2006.01)
*H04L 12/749* (2013.01)
*H04L 12/741* (2013.01)

(52) U.S. Cl.
CPC .......... *H04L 61/2007* (2013.01); *H04L 45/74* (2013.01); *H04L 45/741* (2013.01); *H04L 61/1511* (2013.01); *H04L 67/1002* (2013.01); *H04L 61/6009* (2013.01); *H04L 61/6059* (2013.01)

(58) Field of Classification Search
CPC ............ H04L 61/2007; H04L 61/1511; H04L 61/6009; H04L 61/6059; H04L 45/74
See application file for complete search history.

(56) References Cited

U.S. PATENT DOCUMENTS

| | | |
|---|---|---|
| 9,009,353 B1 | 4/2015 | Donley |
| 2008/0177868 A1 | 7/2008 | Zilbershtein et al. |
| 2010/0118869 A1 | 5/2010 | Li et al. |

(Continued)

OTHER PUBLICATIONS

Extended European Search Report, dated Oct. 24, 2018, Application No. 16780746.0, filed Apr. 24, 2016; 6 pgs.

(Continued)

*Primary Examiner* — Austin J Moreau

(57) ABSTRACT

Aspects of the present disclosure involve systems, methods, computer program products, and the like, for correlating information associated with one networking transmission protocol, such as Internet Protocol version 6 (IPv6), to information associated with a different networking transmission protocol, such as Internet Protocol version 6 (IPv4). More specifically, when resolving an Internet Protocol (IP) address associated with a requesting device to a network, the system may base the resolved destination on one or more attributes of a known address to build a network mapping of the received IP address. In one specific example, an IPv6 address is received and associated with a known IPv4 address to map the network.

17 Claims, 7 Drawing Sheets

(56) References Cited

U.S. PATENT DOCUMENTS

| | | | |
|---|---|---|---|
| 2011/0283018 A1* | 11/2011 | Levine | H04L 29/12066 |
| | | | 709/245 |
| 2011/0289185 A1 | 11/2011 | Heder et al. | |
| 2013/0346202 A1* | 12/2013 | Kouladjie | G06Q 30/06 |
| | | | 705/14.55 |
| 2014/0149601 A1 | 5/2014 | Carney et al. | |
| 2014/0344400 A1 | 11/2014 | Varney et al. | |
| 2016/0308823 A1 | 10/2016 | Maslak | |

OTHER PUBLICATIONS

International Preliminary Report on Patentability dated Oct. 17, 2017, Int'l Appl. No. PCT/US16/027539, Int'l Filing Date Apr. 14, 2016; 9 pgs.

International Search Report dated Jul. 15, 2016, Int'l Appl. No. PCT/US16/027539, Int'l Filing Date Apr. 14, 2016; 3 pgs.

Written Opinion of the International Searching Authority dated Jul. 15, 2016, Int'l Appl. No. PCT/US16/027539, Int'l Filing Date Apr. 14, 2016; 7 pgs.

Berger, Arthur et al., "Internet Nameserver IPv4 and IPv6 Address Relationships", Proceedings of the 2013 Conference on Internet Measurement Conference, IMC '13; XP0555106071, Chapters 1 and 2 Jan. 1, 2013, 14 pgs.

\* cited by examiner

SYSTEM AND METHOD FOR CORRELATING ROUTING PROTOCOL INFORMATION

CROSS-REFERENCE TO RELATED APPLICATIONS

This application is a continuation of and claims the benefit of priority from U.S. patent application Ser. No. 15/099,101 entitled "SYSTEM AND METHOD FOR CORRELATING ROUTING PROTOCOL INFORMATION", filed on Apr. 14, 2016, the entire contents of which are fully incorporated by reference herein for all purposes. Application Ser. No. 15/099,101 claims priority under 35 U.S.C. § 119(e) to U.S. Provisional Application No. 62/147,884 entitled "SYSTEM AND METHOD FOR CORRELATING ROUTING PROTOCOL INFORMATION", filed on Apr. 15, 2015, the entire contents of which are fully incorporated by reference herein for all purposes.

FIELD OF DISCLOSURE

Embodiments of the present invention generally relate to systems and methods for implementing a telecommunications network, and more specifically for resolving network addresses for use in applying one or more attributes to the resolved network address.

BACKGROUND

Telecommunication networks provide for the transmission of information across some distance through terrestrial, wireless or satellite communication networks. Such communications may involve voice, data or multimedia information, among others. One particular example of transmission of data or multimedia information involves a content delivery network (CDN). CDNs are increasingly used to distribute content, such as videos, multimedia, images, audio files, documents, software, and other electronic resources, to end users on behalf of one or more content providers. Using a CDN allows the content providers to increase the speed and reliability of content delivery without deploying additional infrastructure. Moreover, a CDN allows for the distribution of the content through one or more existing networks without the need to store the content within the existing networks.

Typically, a CDN includes several content servers from which the content can be supplied to a requesting end user. In one example, these content servers may be accessed through a telecommunications network to which the end user is in communication. The network may include any number of components to facilitate the connection of the end user to the requested content, such as routers, Internet Service Provider networks, other intermediate networks, and the like. In general, the content available from the CDN is stored on one or more edge clusters connected to the CDN or other upstream content providers. Requests for content are then transmitted by the CDN to the edge clusters or content providers to provide the content to the requesting customers. However, the CDN may desire to direct the end user's computing device to a specific content storage device or server.

It is with these observations in mind, among others, that various aspects of the present disclosure were conceived and developed.

SUMMARY

One implementation of the present disclosure may take the form of a method for operating a telecommunications network. The method may include the operations of receiving a first request associated with a communication on the telecommunications network, the first request comprising a first address in a first address protocol, the first address related to a requesting device from which the request was sent, storing the first address related to the requesting device in a database of routing protocol information, and receiving a second request at the telecommunications network, the second request comprising a second address in a second address protocol, the second address related to the requesting device from which the request was sent, wherein the second address protocol is different than the first address protocol. The method may also include the operations of correlating the first address stored in the database and the second address of the requesting device and assigning an attribute of the second address to the first address of the requesting device.

Another implementation of the present disclosure may take the form of a telecommunications device. The device includes a network communication port to transmit and receive communications over a telecommunications network, a processor, and a memory device in communication with the processor for storing one or more instructions. When the one or more instructions are executed by the processor, the telecommunications device receives a first request from a requesting device through the network communication port, the first request comprising a first address in a first address protocol, stores the first address from the requesting device in a database of routing protocol information, and receives a second request through the network communication port, the second request comprising a second address in a second address protocol, the second address related to the requesting device, wherein the second address protocol is different than the first address protocol. Further, the telecommunications device correlates the first address stored in the database and the second address of the requesting device, assigns an attribute of the second address to the first address, and stores an indication of the assignation of the attribute to the first address in the database.

DETAILED DESCRIPTION

Aspects of the present disclosure involve systems, methods, computer program products, and the like, for extracting information associated with one networking transmission protocol, such as Internet Protocol version 6 (IPv6), based on information associated with a different networking transmission protocol, such as Internet Protocol version 4 (IPv4). More specifically, when resolving an Internet Protocol (IP) address associated with a request for content from a network or to connect a user of the network to an end device, the system may base the resolved destination on attributes of a known address to build a network mapping of the received IP address. In one specific example, an IPv6 address is received and associated with a known IPv4 address to map the network. In another example, an IPv4 address is received and associated with a known IPv6 address to map the network. In one particular example, a geographic location of a requested computing device or machine may be determined or estimated based on an IPv4 address associated with a received IPv6 address of the request. The IPv4 address may be determined from the IPv6 address or the device, such as an Internet Service Provider (ISP) DNS resolver, identified by the IPv6 address to determine the mapping associated with the IPv4 address for use in resolving the request. In one specific example, the IPv4 address associated with the received IPv6 address is used to obtain some attribute, such as a geographic location, of the IPv4 address. An IP address is then resolved, where the IP address of the device to service the request is based, at least in part, on the attribute of the IPv4 address.

Other implementations are also described and recited herein. Further, while multiple implementations are disclosed, still other implementations of the presently disclosed technology will become apparent to those skilled in the art from the following detailed description, which shows and describes illustrative implementations of the presently disclosed technology. As will be realized, the presently disclosed technology is capable of modifications in various aspects, all without departing from the spirit and scope of the presently disclosed technology. Accordingly, the drawings and detailed description are to be regarded as illustrative in nature and not limiting.

Figure 1:
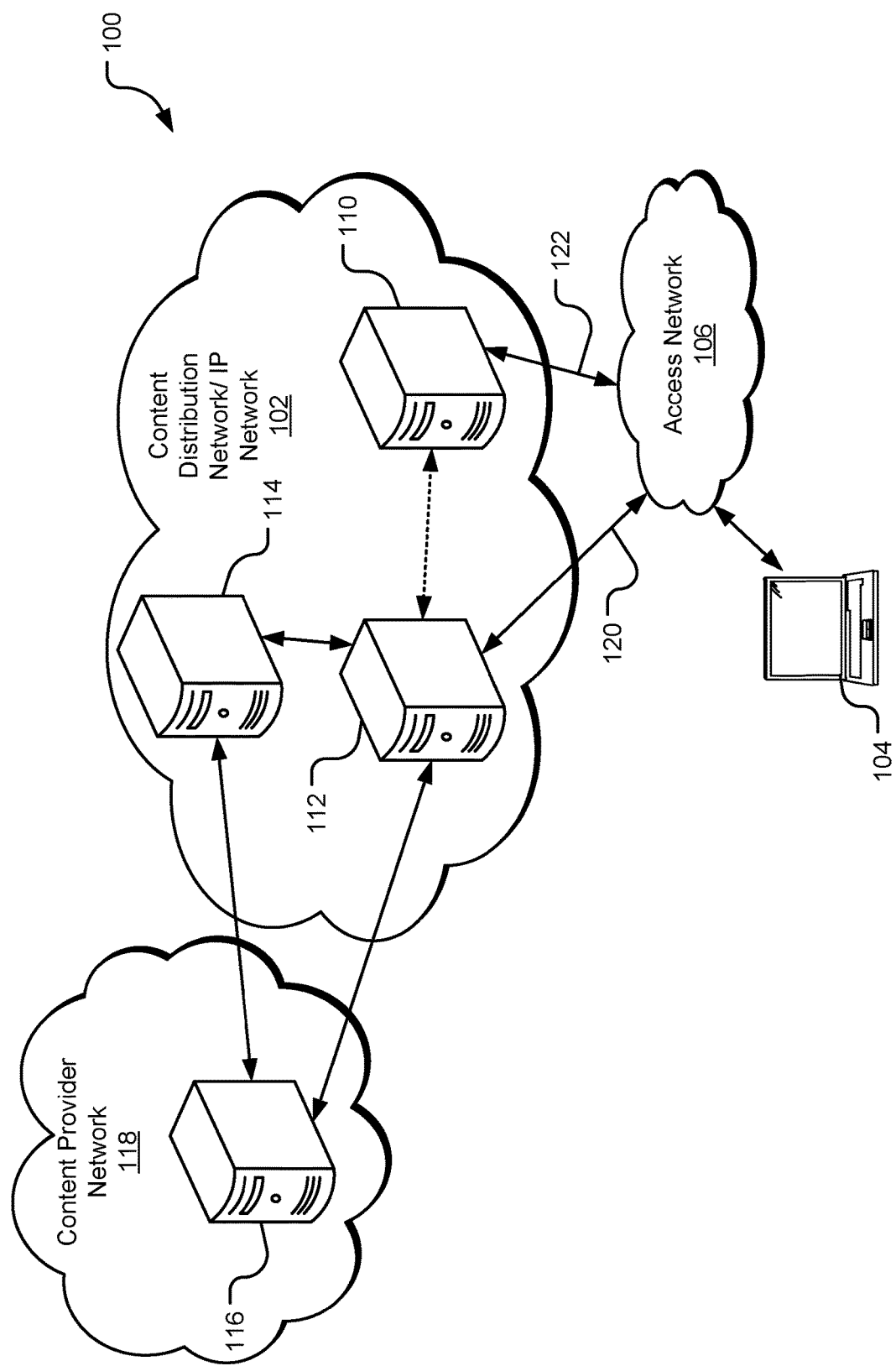
FIG. 1 is an example network environment for distributing content over a telecommunications network.

FIG. 1 is an example network environment 100 for distributing content to one or more users that may be aided by identifying a geographic location of a requesting device. Although illustrated in FIG. 1 as a content delivery network, it should be appreciated that aspects of the present disclosure may apply to any type of telecommunications network that utilizes IP addresses for connecting an end user to one or more components of the network. For example, aspects of the disclosure may be utilized to connect a user of the network to an endpoint in the network, a conferencing server, a virtual private network device, and the like. Thus, although the CDN architecture is used throughout the document as the example network architecture through which aspects of the present disclosure may be applied; other network architectures and configurations are similarly contemplated.

In one implementation of the network environment 100, a CDN 102 is communicably coupled to one or more access networks 106. In general, the CDN 102 comprises one or more components configured to provide content to a user upon a request and an underlying IP network through which the request is received and the content is provided. The underlying IP network associated with the CDN servers may be of the form of any type IP-based communication network configured to transmit and receive communications through the network and may include any number and types of telecommunications components. In this manner, CDN-based components may be added to an existing IP-based communication network such that the components receive a request for content, retrieve the content from a storage device, and provide the content to the requesting device through the supporting IP network. For simplicity, the use of the term "CDN" throughout this disclosure refers to the combination of the one or more content servers and the underlying IP network for processing and transmitting communications, unless otherwise noted.

In one embodiment, a user device 104 connects to the CDN 102 through one or more access networks 106 to request and receive content or content files from the CDN. The access network 106 may be under the control of or operated/maintained by one or more entities, such as, for example, one or more Internet Service Providers (ISPs) that provide access to the CDN 102. Thus, for example, the access network 106 may provide Internet access to a user device 104. In addition, the access network 106 may include several connections to the IP network of the CDN 102. For example, access network 106 includes access point 120 and access point 122. Also, the user device 104 may be connected to any number of access networks 106 such that access to the CDN 102 may occur through another access network. In general, access to a CDN 102 (or underlying IP network associated with the CDN) may occur through any number of ingress ports to the CDN through any number of access networks.

The CDN 102 is capable of providing content to a user device 104, which is generally any form of computing device, such as a personal computer, mobile device, tablet (e.g., iPad), or the like. Content may include, without limitation, videos, multimedia, images, audio files, text, documents, software, and other electronic resources. The user device 104 is configured to request, receive, process, and present content. In one implementation, the user device 104 includes an Internet browser application with which a link (e.g., a hyperlink) to a content item may be selected or otherwise entered, causing a request to be sent to a directory server 110 in the CDN 102.

The directory server 110 responds to the request by providing a network address (e.g., an IP address) where the content associated with the selected link can be obtained. In one implementation, the directory server 110 provides a domain name system (DNS) service, which resolves an alphanumeric domain name to an IP address. The directory server 110 resolves the link name (e.g., URL or other identifier) to an associated network address from which the user device 104 can retrieve the content. The operation of the directory server 110 and access network 106 to resolve requests for content from the user device 104 is discussed in more detail below with reference to FIG. 2.

In one implementation, the CDN 102 includes an edge server 112, which may cache content from another server to make it available in a more geographically or logically proximate location to the user device 104. The edge server 112 may reduce network loads, optimize utilization of available capacity, lower delivery costs, and/or reduce content download time. The edge server 112 is configured to provide requested content to a requestor, which may be the user device 104 possibly via an intermediate device, for example, in the access network 106. In one implementation, the edge server 112 provides the requested content that is locally stored in cache. In another implementation, the edge server 112 retrieves the requested content from another source, such as a media access server (MAS) (e.g., a content distribution server 114 or a content origin server 116 of a content provider network 118). The content is then served to the user device 104 in response to the requests.

Figure 2:
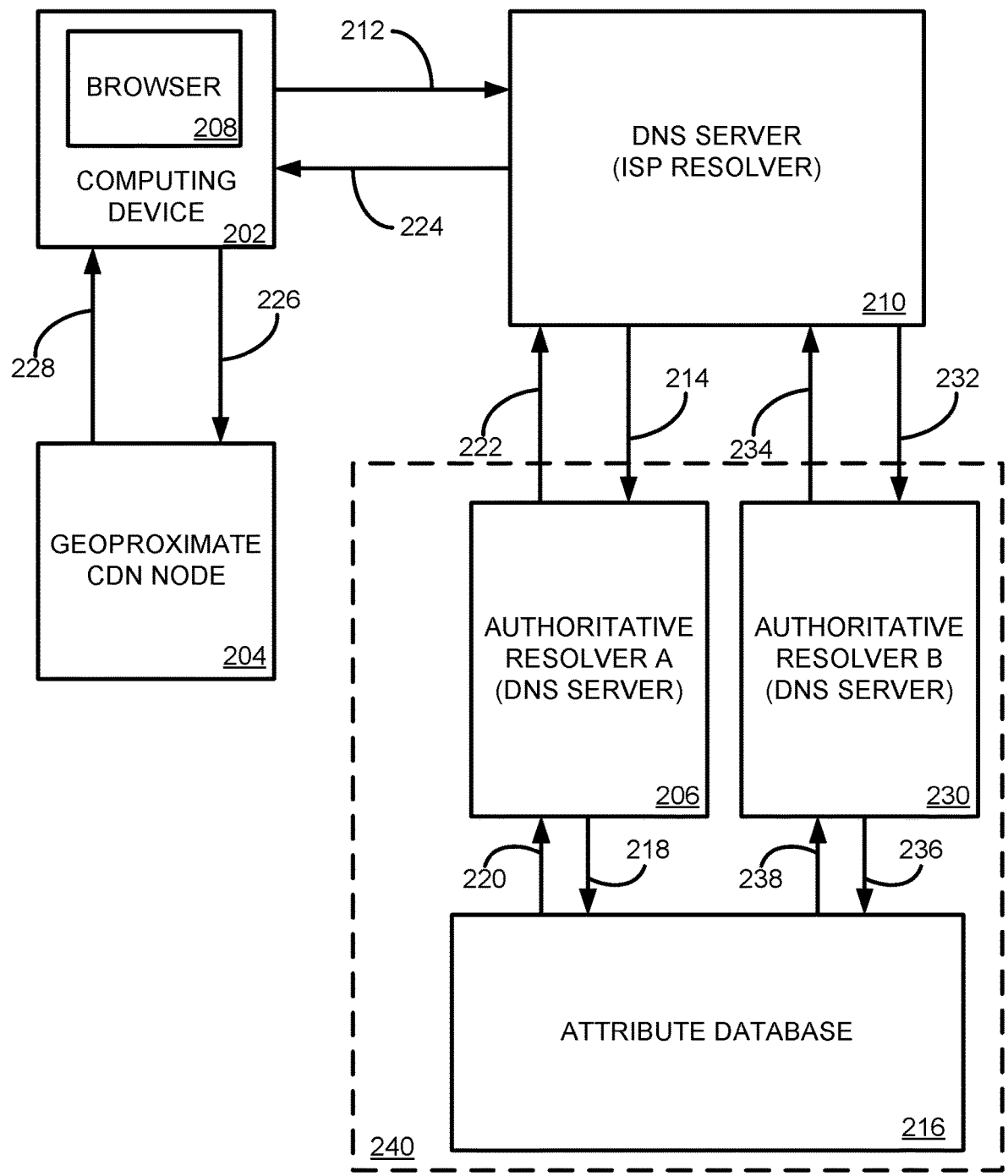
FIG. 2 is an example network environment 200 for providing content to a user of a network through the resolving of an IP address associated with the request for content.

FIG. 2 is an example network environment 200 for providing content to a user of a CDN through the resolving of an IP address associated with the request for content. The components of the network 200 are similar or the same as components discussed above with reference to the network 100 of FIG. 1. For example, the network environment 200 of FIG. 2 includes a user computing device 202, a CDN edge server (referred in FIG. 2 as a "Geoproximate CDN Node" 204) configured to provide content to the user computing device, and a DNS server 206, discussed above in relation to the CDN. Other components of the network 200 of FIG. 2 may also be included in the network 100 environment of FIG. 1, if not explicitly shown in FIG. 1. The operation of the network 200 and components of the network of FIG. 2 is discussed below.

As mentioned above, a user of the CDN 200 may request content or a content file from the CDN. In one example, a user of the user computing device 202 enters a link name (e.g., URL or other identifier) into a browser 208 executed on the computing device. The link name is associated with a network address within the CDN 200 at which the content may be obtained and provided to the computing device. For example, the user or the user device may enter a URL such as http://www.example.com/content into the browser 208 of the computing device 202. Upon entering the URL, the hostname may be extracted by the browser 208 (www.example.com in this particular case), which then sends a request (possibly via an operating system running within the computing device 202) to a DNS 210 associated with the user's access network (transmission arrow 212). The DNS associated with the user's access network is known as the ISP resolver 210. In one example, the DNS request 212 transmitted to the ISP resolver 210 from the computing device 202 includes the hostname of the requested content, as well as an IP address associated with the computing device. In some implementations, multiple protocol addresses may be sent to the ISP resolver, or an address may be sent that corresponds to a different transmission protocol than the protocol used to contact the ISP resolver 210. Further, the IP address of the computing device 202 may be in transmission protocol IPv4 or IPv6. In general, however, the transmission protocol of the DNS request from the computing device 202 may be any protocol known or hereafter developed, and may include information in addition to a hostname or address.

While the ISP resolver 210 is often implemented to cache responses, the ISP resolver often does not have a cached IP address for the requested content within the CDN 200. The ISP resolver 210 may also maintain distinct caches for subsets of computing devices that use the ISP resolver 210, and the subset used by computing device 204 may not have a cached IP address for the content within CDN 200, even though the ISP resolver 210 does have cached IP addresses for other subsets of computing devices. In such cases, the ISP resolver 210 transmits a second DNS request (transmission arrow 214) to a DNS server 206 of the CDN (referred to in FIG. 2 as "Authoritative resolver A") to determine an IP address in the CDN 200 at which the content file may be obtained. Similar to the DNS request 212 above, the DNS request 214 to Authoritative resolver A 206 may include the hostname of the requested content, as well as an IP address or addresses associated with the computing device and/or an IP address or addresses associated with the ISP resolver 210 of the access network. Further, the IP addresses of the computing device 202 and the ISP resolver 210 may be in transmission protocol IPv4 or IPv6.

Figure 3:
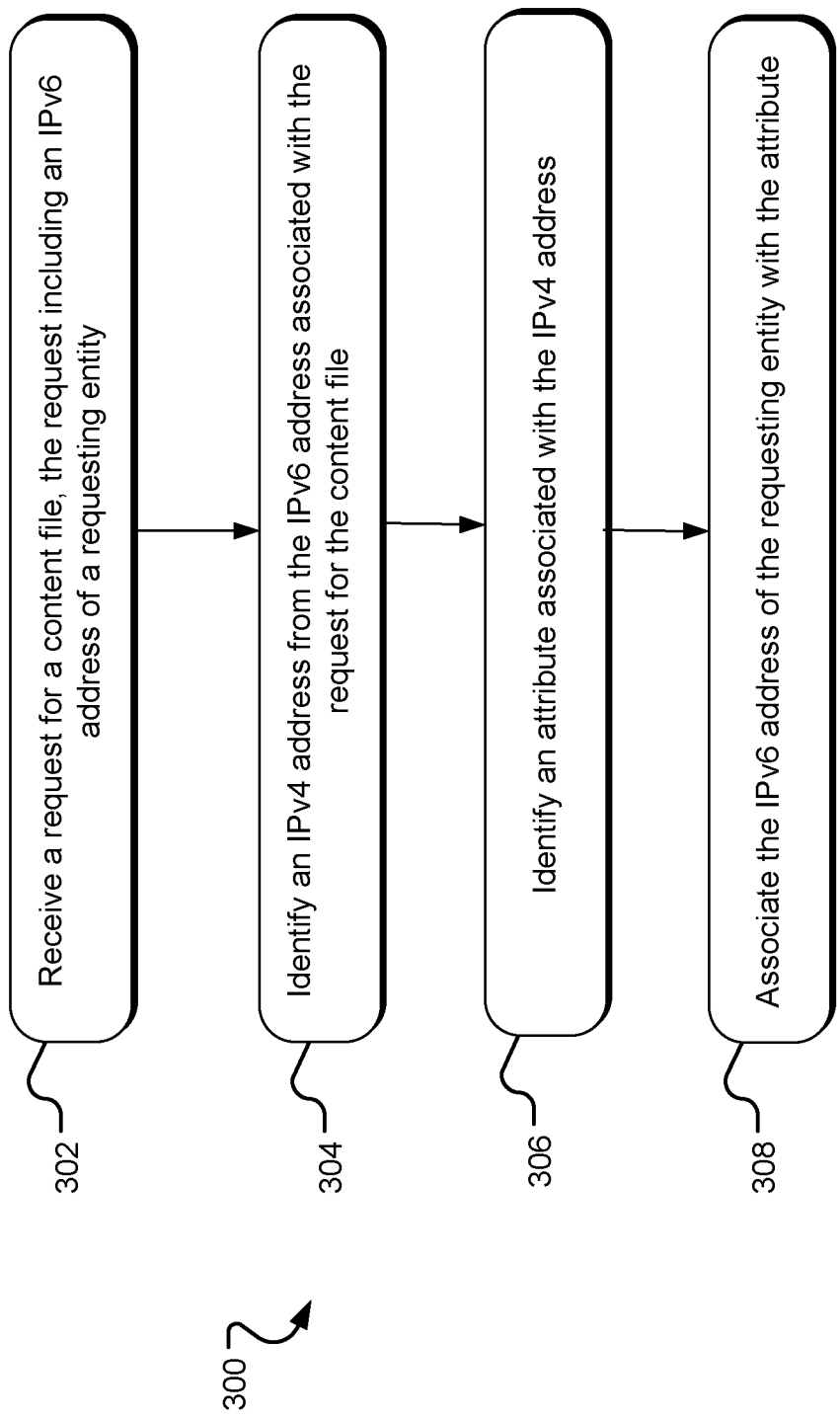
FIG. 3 is a flowchart of a method for a network resolver to obtain an attribute associated with a first type of an IP address from a second type of an IP address.

In the case where the DNS request 216 includes an IPv6 address of the ISP resolver 210 or the computing device 202, Authoritative resolver A 206 may attempt to determine one or more attributes concerning the request from the IPv6 address. In particular, Authoritative resolver A 206 may perform one or more of the operations of the method illustrated in FIG. 3. FIG. 3 is a flowchart of a method for a DNS resolver to obtain an attribute associated with an IPv4 address from an IPv6 address. In general, the operations of the method of FIG. 3 are performed by a resolver device of a CDN or IP network in response to a request for a content file or termination of a communication at a component of the IP network.

Beginning in operation 302, the DNS CDN resolver 206 receives the DNS request 214 from one or more components of the ISP or access network 210. In operation 304, the CDN or IP network identifies an IPv4 address associated the IPv6 address. In particular, the CDN or IP network 240 identifies an IPv4 address associated with the DNS server 210 or user computing device 202. The IPv4 address in the IPv6 address of the DNS request 214 may be determined in many ways. For example, the CDN or IP network 240 may utilize a second DNS server (referred to herein as "Authoritative resolver B" 230) that is configured to receive IPv4 requests from DNS resolvers. By instructing the DNS server 210 to send the DNS request to Authoritative resolver B 230 utilizing an IPv4 address, the CDN or IP network 240 may associate a received IPv6 address with a related IPv4 address. Several methods that may be utilized to obtain a related IPv4 from a received IPv6 address are described in more detail below.

In some embodiments, Authoritative resolver A 206 and Authoritative resolver B 230 may be the same resolver device of the CDN and are discussed as resolver A and resolver B herein to distinguish between the functions of the resolver at separate times. In another embodiment, Authoritative resolver A 206 and Authoritative resolver B 230 may be the different components of the CDN identifiable by different location addresses within the network. In yet other embodiments, Authoritative resolver A 206 and Authoritative resolver B 230 may be accessible through different telecommunication networks or CDNs.

In general, the obtained IPv4 address is associated with the requesting device that transmits the DNS request 214. For example, many ISP networks are assigned both a range of IPv4 addresses and IPv6 addresses for components, destinations, and customers within the ISP network. To simplify administration within a network, many ISP networks assign both an IPv6 and an IPv4 address to components, destinations, and customers of the network. This can make the network easier to use and manage, as a network transitions from IPv4-only to a combined IPv4 and IPv6 network.

In operation 306, Authoritative resolver A 206 identifies an attribute associated with the obtained IPv4 address. In one example, a geographic location may be associated with the IPv4 address received at the CDN or IP network 240. In one embodiment of the network 240 illustrated in FIG. 2, geographic information associated with IPv4 may be obtained from an attribute database 216. This database 216 may be maintained by the network 240 (such as the CDN) or may be obtained from a third party. In another example, the geographic information may be obtained from a third party and stored for later reference by the network 200 in the attribute database 216. To obtain the attribute associated with the IPv4, Authoritative resolver A 206 or Authoritative resolver B 230 may transmit a request 218, 236 for the information from the database 216. In response to the request 218, 236, the database 220 may transmit the requested information 220 to the requesting Authoritative resolver 206, 230.

Although discussed above and throughout as an estimated geographic location, the attribute associate with the IPv4 address may be any attribute that is useful to the CDN 200 in resolving the DNS request for the content. For example, the attribute may be one or more levels of service, network connection type, device type, or similar type of information for the particular requesting device or network. Similar to above, any attributes associated with an IPv4 address may be obtained from a database of the network or a database of a third party to the network. In general, any attribute associated with the obtained IPv4 address may be utilized by CDN or IP network 240 to resolve the request for content from the CDN 200.

In operation 308, CDN or IP network 240 may associate the attribute of the IPv4 address with the received IPv6 address for future use. For example, CDN or IP network 240 may associate the attribute to the received IPv6 address and store the association in the database 216. In another embodiment, the addresses received at the CDN or IP network 240 may be stored and correlated in a separate database or storage server of the network. Through the method of FIG. 3, when another DNS request for content is received at the CDN or IP network 240 from the same IPv6 address as a previous DNS request, the network may determine that the received IPv6 address may be assigned to the same or similar device as an IPv4 address based on the stored correlation. If a correlation exists, one or more attributes associated with the IPv4 address may also be associated with the IPv6 address such that correlation of the attribute with the IPv6 address is determined without the need to determine the related IPv4 address to the IPv6 address.

In general, the operations of the method of FIG. 3 may be performed either in an "online" or real-time fashion in response to requests for content, or "offline" using query logs to other stored data to build a database of associations between IPv6 addresses and IPv4 addresses or between IPv6 addresses and the relevant attribute related to the associated IPv4 address. This offline process may generate a database (such as database 216) that is used by the online querying system, allowing for lookups for the attributes without the need to derive the IPv4 address from the received IPv6 address. This database 216 may also be used by systems that themselves do not implement the method 300 of FIG. 3. In addition, a database 216 containing associations between IPv4 and IPv6 addresses may be used in place of operation 304 when determining the IPv4 address from the IPv6 address.

Returning to the network 200 of FIG. 2, Authoritative resolver A 206 or Authoritative resolver B 230 may resolve the DNS request 214 by determining an IP address of a content node 204 from which the content may be obtained by the requesting device 202. In one embodiment, the IP address of the content node 204 may be resolved based at least on the obtained attribute of the IPv4 address. In one particular example, the attribute may be an estimated geographic location of the computing device 202 or the ISP network through which the computing device communicates to the CDN or IP network 240. As mentioned above, it is often advantageous to provide content to a computing device 202 from a content node 204 that is geographically near the computing device. Thus, the IP address of the content node 204 returned by CDN or IP network 240 may be for a content node 204 that is geographically close to the computing device 202.

In this manner, CDN or IP network 240 returns a geoproximate IP address 222, 234 for the requested content to the ISP resolver 210. The ISP resolver 210 then forwards the geoproximate IP address for the requested content to the computing device 202 (transmission arrow 224). With this information, the computing device 202 transmits a content request 226 to the geoproximate CDN node 204 and, in response, the content 228 is transmitted to the computing device 202.

As mentioned above, extracting an IPv4 address from an IPv6 address and assigning attributes associated with the IPv4 address to the IPv6 address may be used in any telecommunications network architecture. In one embodiment, aspects of the present disclosure may be utilized to connect a user of the network to other components in the network, such as an endpoint in the network, a conferencing server, a virtual private network device, and the like. For example, a network may utilize a CDN DNS infrastructure to connect an end user of the network the endpoint device. In other words, the DNS of the CDN may be utilized by the network (or a third party network) to resolve the IP address for the endpoint device. In some instances, further, it may be beneficial to connect the user of the network to an endpoint device that is geographically near the user. For example, a client of the network may have a European and a United States based location. The client may include a VPN device in the telecommunications network in both locations, as well as interconnection between the two locations via a private network or tunnel. If a user of the network logs into the internet while located in Europe, the network may attempt to connect the user to the VPN endpoint in Europe rather than the VPN device in the United States. In this scenario, the telecommunications network may attempt to determine a geolocation of the user based on the user's IPv6 address provided. Further, by extracting an IPv4 address from the IPv6 address of the user, the network may identify and connect the user to a device that is geographically near the user.

In another example, the telecommunications may perform some type of geoblocking and/or similar technology. Geoblocking is the method of preventing users in a particular country from accessing content (because of licensing or other requirements). If the user attempting to access the content provides an IPv6 address, the network may attempt to obtain an IPv4 address from the IPv6 address and associate a geolocation with the user to accurately apply geoblocking. Other examples include using the attribute of the IPv4 address from the IPv6 address to select a default language for a user, assist in locating a user for law enforcement or emergency response purposes, and the like.

As shown, assigning an attribute of an IPv4 address to an associated IPv6 address, such as an approximate geographic location of the device using the IPv6 address, may be utilized by a telecommunications network in many ways to assist the network. Thus, a database of IPv6 addresses and associated attributes may be useful to the network. As also described above, the network may build such a database offline and not necessarily in response to receiving a request for content from a user. Rather, the network may analyze some of all ISP resolvers that have made a request to the network over a certain time period. The network may run a program against the ISP resolvers and extract one or more IPv4 addresses from the IPv6 addresses, where possible. The IPv4 addresses extracted by the network may then be used to populate the database of IPv6 addresses with an associated attribute, such as in building an approximate geographic location database of recognized IPv6 addresses. This information may then be stored in the database and available for one or more devices of the network to obtain an attribute of an IPv6 address for use by the network. By maintaining the database, the network may not need to extract the IPv4 address from the IPv6 address whenever the IPv6 address is received. Further, the database of attributes and IPv6 addresses may be provided to other networks and/or devices for use by those networks in a similar manner as described above with reference to the CDN architecture. In one particular example, the database 216 of the network of FIG. 2 may be populated or updated offline for a subset of IPv6 addresses obtained from one or more DNS resolvers.

Figure 4:
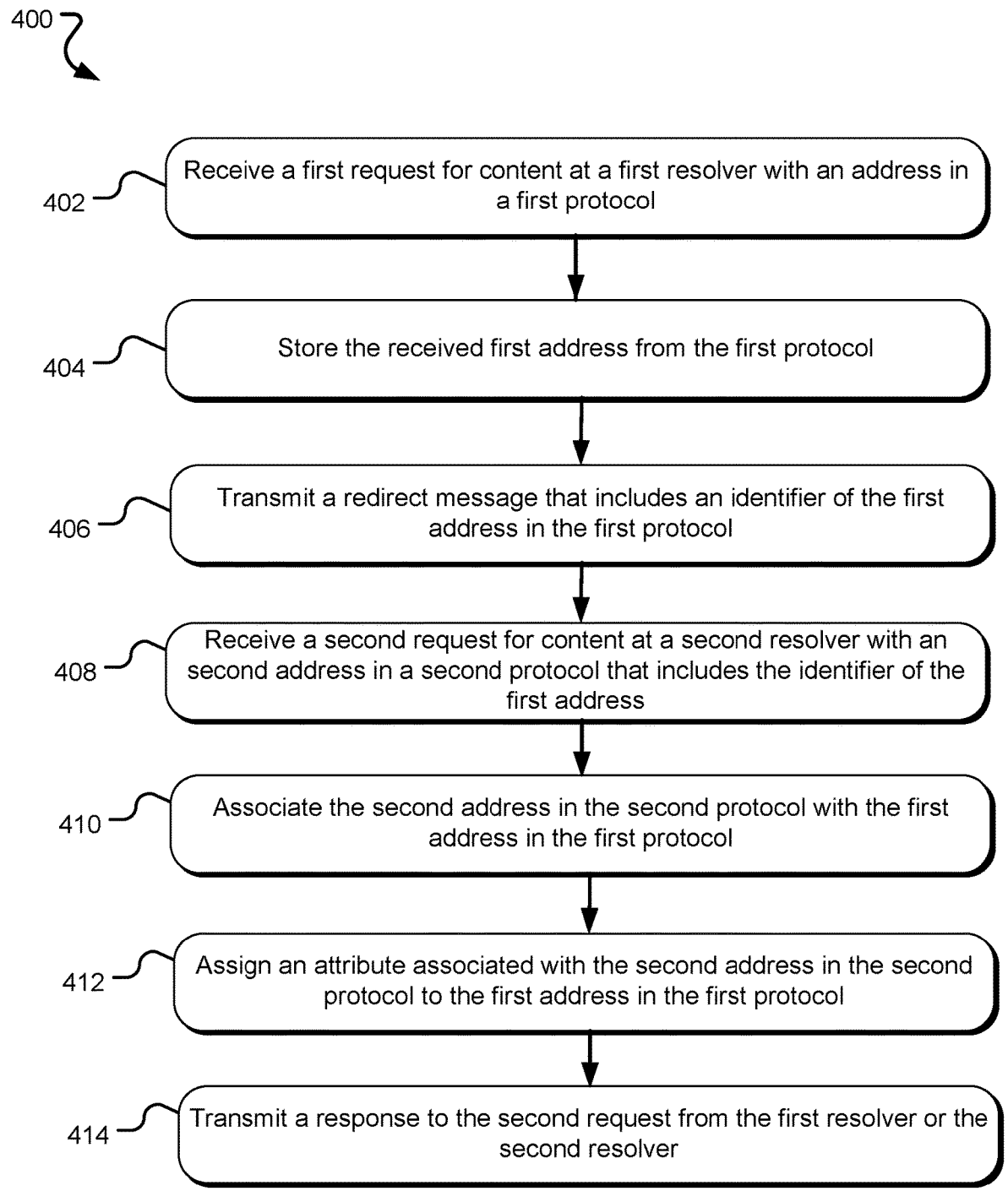
FIG. 4 illustrates a flowchart of a method for associating an IPv4 address with a received IPv6 address of a DNS request.

As mentioned above, the DNS request received at the ISP resolver 210, Authoritative resolver A 206, Authoritative resolver B 230 may include an IPv6 associated with the requesting device or network. The receiving resolver, however, may not have attributes associated with the received IPv6 address to aid in resolving the request into an optimized IP address for the content providing device. Thus, it may benefit the CDN 200 to obtain a related or correlated IPv4 address for the requesting device or network to aid in resolving the DNS request where IPv4 attributes may be more inclusive. FIG. 4 illustrates a flowchart of a method for associating an IPv4 address with a received IPv6 address of a DNS request. In one embodiment, the operations of the method of FIG. 4 may be performed by one or more resolvers associated with a CDN. However, any device within the CDN or access network or IP network may perform the operations of FIG. 4. In addition, the operations may be performed through the execution of one or more software instructions, through one or more hardware circuits, or through a combination of software and hardware.

Beginning in operation 402, the CDN or IP network receives a first request for content at a first resolver of the network. In one example, the first request is from a device identified by an IPv6 address and the request is configured such that the IPv6 address of the requesting device is included in the request. However, the protocol address of the device that transmits the first request to the CDN or IP network may belong to any transmission protocol, such as IPv4. Utilizing the network 200 illustrated in FIG. 2, a request for content may be received from the ISP resolver 210 at the authoritative resolver A 206 (transmission arrow 214). In one particular embodiment, the request includes a hostname for the requested content. Based on the hostname for the content included in the request, the request is transmitted to authoritative resolver A 206 by the IP network or CDN 240 as the most likely DNS resolver to resolve the request.

In operation 404, the authoritative resolver A 206 or the underlying CDN or IP network 240 may store the received address of the requesting device. In the example above, the IPv6 address of the requesting DNS resolver 210 may be stored by the network 240. In one particular example, the address of the requesting device may be stored in a database 216 of the network 204 (transmission arrow 218). Further, the CDN or IP network 240 may generate an identifier that is associated with the stored address of the requesting device. In one example, the identifier may be the stored address, such as the IPv6 address of the requesting device. Also, in operation 406, the authoritative resolver A 206 may transmit a message to the requesting device (in this example, the DNS resolver 210) that may be in-turn resolved by the ISP DNS resolver, or be redirected, as shown by transmission arrow 222. In general, the redirect message instructs the requesting device to transmit another request for the content in another protocol that includes some identification of the stored address above. For example, the redirect message may instruct the ISP resolver 210 to transmit another request to the CDN 240 utilizing an IPv4 address associated with the resolver. As explained in more detail below, this second request to the CDN 240 may include an identifier of the first request such that the CDN may correlate the two requests transmitted to the CDN. In one example, the identifier is the IPv6 address of the requesting device. However, the identifier included in the redirect message may be any identifier that is unique to the requesting device.

In one particular example, the authoritative resolver A 206 may, in response to receiving a request for content from the ISP resolver 210, transmit a redirect message to the ISP resolver. The redirect message may include a Canonical Name Record (CNAME) entry in the transmitted message. In one embodiment, the CNAME redirect message transmitted to the ISP resolver 210 includes the IPv6 address received at the authoritative resolver A 206 as discussed above. In addition, the CNAME may include an alias domain name that redirects the ISP resolver 210 to a second authoritative resolver B 230 of the CDN 240. For example, the redirect message may include the received IPv6 address from the ISP resolver 210 followed by v6assoc.example.net. Upon receipt of the redirect message, the ISP resolver 210 determines the alias domain name (in this example, v6assoc.example.net) is best answered by the second authoritative resolver B 230, as described below in more detail.

As discussed, the ISP resolver 210 may transmit a second request message to the authoritative resolver B 230 by following the alias domain name of the redirect message. Thus, in operation 208, the authoritative resolver B 230 receives a request for the content from the ISP resolver 210, as shown in transmission arrow 232. The second request to the authoritative resolver B 230 may include the alias domain name and an identifier of the first request received at the authoritative resolver A 206. In one particular embodiment, the identifier in the second request to the authoritative resolver B 230 is the IPv6 of the ISP resolver 210. In addition, the authoritative resolver B 230 may be configured to only receive requests in a particular protocol. For example, the authoritative resolver B 230 may be configured to only receive requests in IPv4. Thus, the second request transmitted by the ISP resolver 210 may be transmitted to the authoritative resolver B 230 utilizing the IPv4 address of the ISP resolver.

Through the operations above, the authoritative resolver B 230 receives a request utilizing the IPv4 address of the ISP resolver 210 that also include the IPv6 address of ISP resolver. Thus, in operation 410, the CDN or IP network 240 may associate the IPv4 address of the ISP resolver 210 with the IPv6 address of the ISP resolver. However, the association of one protocol IP address of the requesting device with a second protocol IP address may be of any known or hereafter developed protocol. Further, the association of the ISP resolver 210 protocol address may be stored in the database 216 or other storage device of the CDN 240 for future use.

In operation 412, authoritative resolver B 230 may associate an attribute of the IPv4 address of the requesting device 210 with the received request for content. In one particular example, the attribute may be an estimated geographic location of the computing device 202 or the ISP network 210 through which the computing device communicates to the CDN or IP network 240. In operation 414, authoritative resolver B 230 returns a geoproximate IP address for the requested content to the ISP resolver 210 for forwarding onto the user's computing device 202. In addition, the association of the attribute associated with the IPv4 address of the requesting device with the IPv6 address of the requesting device may be stored by the CDN 240 for future use. Thus, when another DNS request for content is received at the CDN or IP network 240 from the same IPv6 address as a previous DNS request, the network may determine that the received IPv6 address may be assigned to the same or similar device as an IPv4 address based on the stored correlation. If a correlation exists, one or more attributes associated with the IPv4 address may also be associated with the IPv6 address such that correlation of the attribute with the IPv6 address is determined without the need to determine the related IPv4 address to the IPv6 address. Therefore, transmission of the redirect message to another authoritative resolver of the CDN 240 may not be necessary for requests for content received from that particular requesting device that already has an associated attribute to the IPv6 address.

Figure 5:
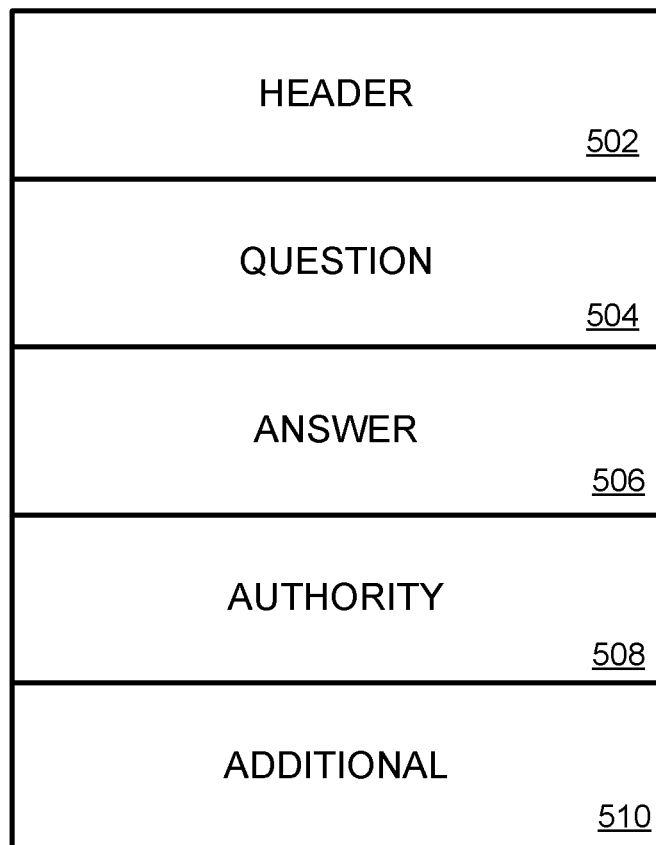
FIG. 5 illustrates a block diagram of various fields of a typical DNS message.

In another embodiment of the present disclosure, the redirect message transmitted by the authoritative resolver A 206 may include additional information than described above. For example, in addition to the CNAME including an alias domain name and the identifier of the requesting device IPv6 address, the redirect message may include additional information in other fields of the DNS message. FIG. 5 illustrates a block diagram of various fields of a typical DNS message. In particular, a DNS message may include a header field 502, a question field 504, an answer field 506, an authority field 508, and an additional information field 510. In general, the question field 504 includes the request for the content, or more particular, a query type and a hostname associated with the requested content file. The answer field 506 may include the response to the question, including an IP address of a CDN node 204 from which the content may be retrieved. In one particular embodiment, the CNAME discussed above may be included in the answer field 506 of the DNS redirect message. In addition to the CNAME, the answer field 506 may also include a time-to-lapse (TTL) indicator that determines the duration the device receiving the DNS redirect message holds the information contained in that particular field. In one example, the answer field 506 that includes the CNAME may include a relatively short TTL so that the redirect of the request ceases quickly once a database of associations has been created.

In the authority field 508, the redirect message may include information on which servers of the CDN 240 are responsible for the zone of the hostname in the URL included in the initial request. For example, the authority field 508 may include an address for a particular server in the CDN 240 for the next request for the particular content received at the ISP resolver 210. Thus, upon receiving another request for the content from a user device 202, the ISP resolver 210 may access the information in the authority field 508 and follow the address in the authority field to a particular authoritative resolver 230 of the CDN which may have multiple addresses to be temporarily associated with an incoming request to Authoritative Resolver A. In one example, the authoritative resolver of the CDN may be authoritative resolver B 230. Similar to above, the authoritative resolver indicated in the authority field 508 may be an IPv4-only resolver or otherwise may be dedicated to a particular IP protocol. In this manner, the ISP resolver 210 is redirected to another authoritative resolver 230 of the CDN 240 such that the IPv6 and the IPv4 addresses of the ISP resolver may be correlated by the CDN. The information in the authority field 508 may also include a relatively short TTL associated with the field for the redirection, such that once the association is made, the ISP resolver will quickly expire the authority pointing at Authoritative Resolver B.

In addition to the above, the DNS redirect message may include information in the additional field 510. For example, the redirect message may include additional details for ISP resolver 210 to locate Authoritative resolver B 230, such as the IPv4 address of Authoritative resolver B. The data in the additional field 510 may be assigned a relatively long TTL such that, although the ISP resolver 210 receives a response to the initial query, the redirect for further requests for the content to authoritative resolver B 230 may be held longer by the ISP resolver than the initial response. In this manner, the fields of the DNS message may be utilized to redirect the request for content as described above with relation to the method of FIG. 4.

Figure 6:
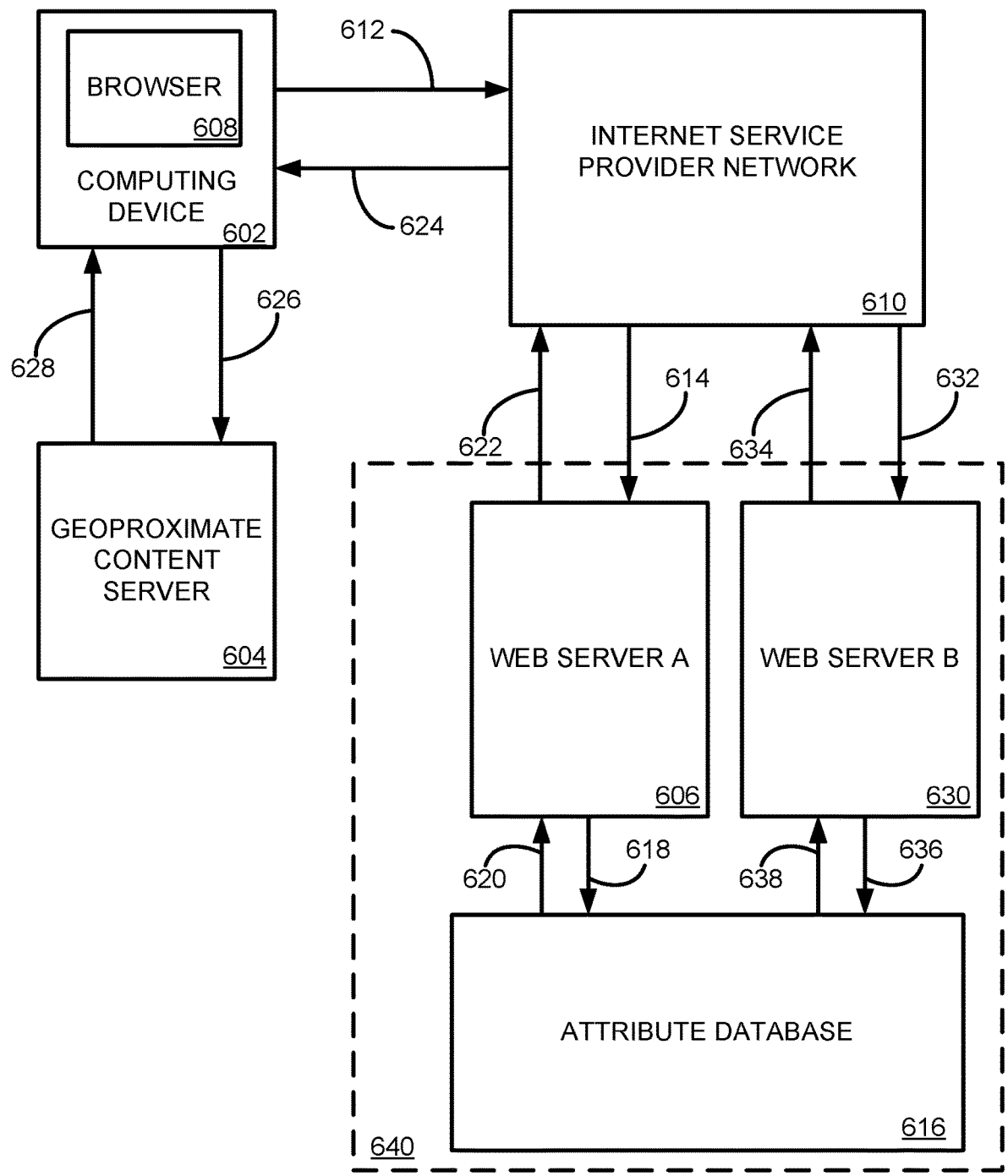
FIG. 6 is an example network environment for providing requested content to a user computing device based on a hypertext transfer protocol message.

Although discussed above with relation to DNS requests for content, similar operations may be utilized in other transmission protocols. For example, the operations may be performed through one or more hypertext transfer protocol (HTTP) messages. FIG. 6 is an example network environment 600 for providing content to a user computing device in response to a received HTTP request. The components and functionalities of the network 600 are similar or the same as discussed above with reference to FIG. 2. For example, a user's computing device 602 may generate an HTTP get command message to request some information from a telecommunications network 640. The request is transmitted (arrow 612 and 614) to the network 640 through an ISP network 610 in communication with the user computing device 602. In particular, the request is received at a web server (such as web server A 606) of the network 640. Similar to the DNS resolvers discussed above and in response to the get command, the web server A 606 may log the IPv6 or IPv4 address of the requesting device included in the HTTP get command and return an HTTP redirect command that appends the unique id (such as the IPv6 address of the user's computing device 602 or ISP network 610) to the redirect IP address. The requesting device 602 may then transmit another HTTP get command to the redirect IP address (corresponding to web server B 630) that includes the unique identifier. In this example, web server B 630 may be an IPv4 only web server that forces the HTTP get command to include the IPv4 address of the computing device 602 or ISP network 610. The web server B 630 may then correlate the unique identifier (such as the requesting device IPv6 address) with the IPv4 address of the second HTTP get command as described above and return the requested content page to the requesting device 602. Similar to the examples listed above, the web server A 606 and the web server B 630 may be the same or a different server in this example. In another example, the web server A 606 and/or web server B 630 may be CDN edge cache devices to provide the content or an address of a geoproximate device 604 to the user's computing device 602

In yet another embodiment, web server A 606 may return a media manifest in response to the HTTP get command received at the server. The media manifest may include a least one entry that redirects the requesting device to web server B 630. Similar to the above, web server B 630 may receive an HTTP get command from the requesting device that references an IPv4 address of the requesting device where the initial request referenced the IPv6 address of the requesting device. The telecommunications network 640 may then correlate the two addresses as discussed above. In response to the IPv4 request for the content chunk, web server B 230 may provide the chunk to the requesting device. Thus, in this embodiment, at least one chunk of the media manifest directs the requesting device to the IPv4-only resolver such that the two addresses of the requesting device is correlated.

In still another embodiment, the web server A 206 may return a response (such as the requested content page) to the HTTP get command received at the resolver. In addition to the returned page, the response may include a cookie or other type of identification that is stored by the requesting device. At some later point, the requesting device may again transmit an HTTP get command. However, in this case, the HTTP get command may be sent utilizing a transmission protocol that is different from the first request from the requesting device. For example, the second get command may refer to an IPv4 address of the requesting device while the first get command may refer to an IPv6 address of the device. The second HTTP get command may include the cookie or other identifier received in response to the first get command. The IP network or CDN may recognize the cookie and correlate the IPv6 and the IPv4 addresses. In addition, the IP network or CDN may analyze the received cookie to determine if the requesting device transmitting the second get command is from a similar ASN as the device transmitting the first get command, to increase the likelihood that the requesting device has not roamed or relocated to a different access network. Further, the cookie or other identifier may have an associated expiration time to aid in the accuracy of the correlation of the IP addresses received at the IP network or CDN.

Through the systems and methods described above, a telecommunications network may correlate related IP addresses for a particular device or network that utilizes the telecommunications network. For example, a requesting device or network may utilize both an IPv4 address and an IPv6 address. Further, the telecommunications network may perform certain routing decisions based on information known about the location or other attribute of the requesting device. Therefore, it may be beneficial to the operation of the telecommunications network to know both the IPv4 address and the IPv6 address of a requesting device or network and associate any known attributes about the requesting device or network with both addresses. In one embodiment, the telecommunications network may obtain both addresses from the requesting device by receiving a first request to use the network, storing a received address for the requesting device, redirecting the requesting device to transmit another request for use of the network utilizing the second address of the requesting device, and receiving and storing the second address from the second request. Such systems and methods may be utilized in any IP telecommunications network, such as a CDN. Further, the requests may be received at the same device in the network for correlation, or separate devices. Once the two addresses of the requesting device or network are received and correlated, routing of requests to the network may be based on the correlated addresses and a mapping of the network may be performed.

Figure 7:
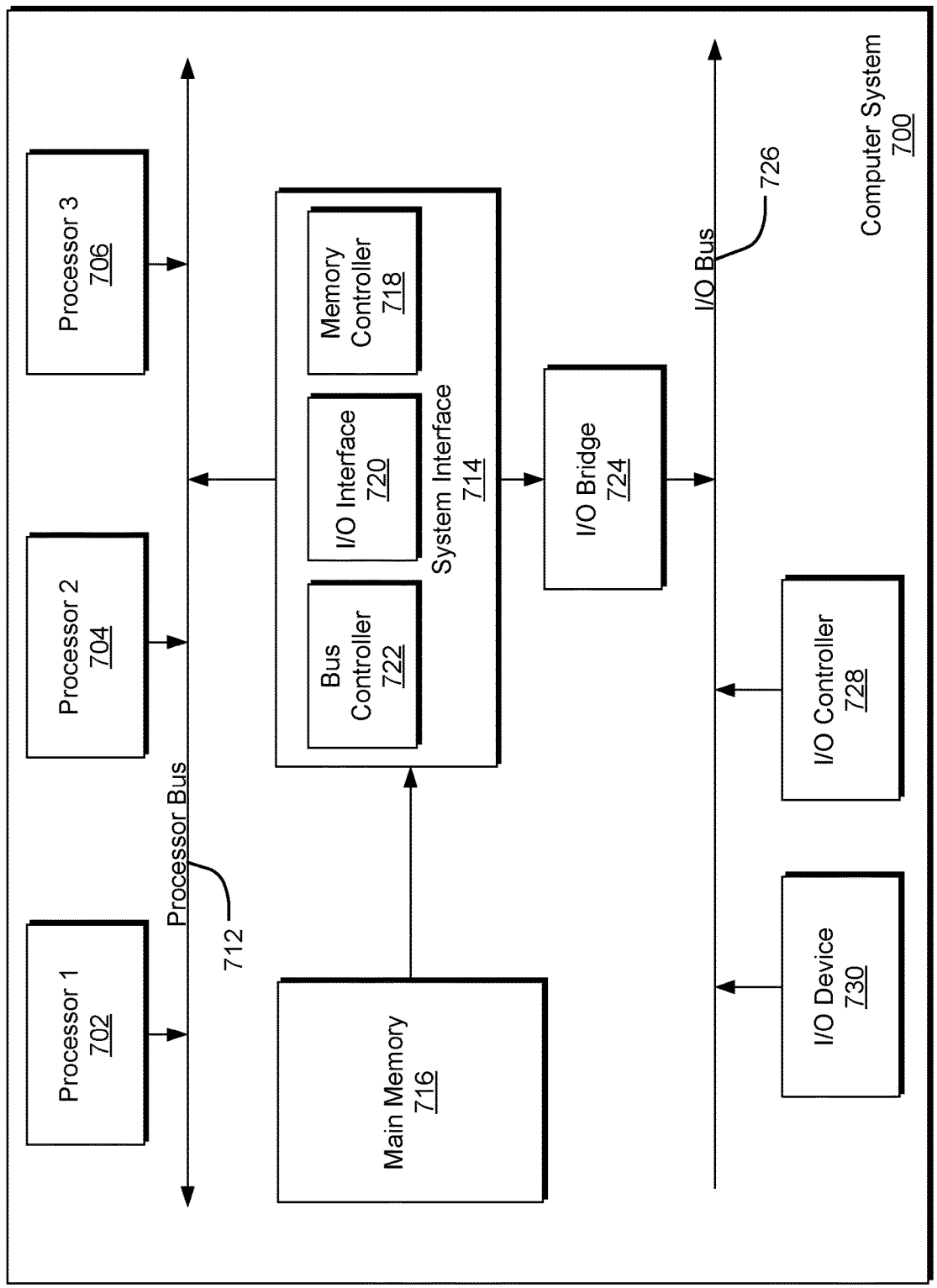
FIG. 7 is a diagram illustrating an example of a computing system which may be used in implementing embodiments of the present disclosure.

FIG. 7 is a block diagram illustrating an example of a computing device or computer system 700 which may be used in implementing the embodiments of the components of the network disclosed above. For example, the computing system 700 of FIG. 7 may be the CDN or ISP resolver device discussed above. The computer system (system) includes one or more processors 702-706. Processors 702-706 may include one or more internal levels of cache (not shown) and a bus controller or bus interface unit to direct interaction with the processor bus 712. Processor bus 712, also known as the host bus or the front side bus, may be used to couple the processors 702-706 with the system interface 714. System interface 714 may be connected to the processor bus 712 to interface other components of the system 700 with the processor bus 712. For example, system interface 714 may include a memory controller 714 for interfacing a main memory 716 with the processor bus 712. The main memory 716 typically includes one or more memory cards and a control circuit (not shown). System interface 714 may also include an input/output (I/O) interface 720 to interface one or more I/O bridges or I/O devices with the processor bus 712. One or more I/O controllers and/or I/O devices may be connected with the I/O bus 726, such as I/O controller 728 and I/O device 740, as illustrated.

I/O device 740 may also include an input device (not shown), such as an alphanumeric input device, including alphanumeric and other keys for communicating information and/or command selections to the processors 702-706. Another type of user input device includes cursor control, such as a mouse, a trackball, or cursor direction keys for communicating direction information and command selections to the processors 702-706 and for controlling cursor movement on the display device.

System 700 may include a dynamic storage device, referred to as main memory 716, or a random access memory (RAM) or other computer-readable devices coupled to the processor bus 712 for storing information and instructions to be executed by the processors 702-706. Main memory 716 also may be used for storing temporary variables or other intermediate information during execution of instructions by the processors 702-706. System 700 may include a read only memory (ROM) and/or other static storage device coupled to the processor bus 712 for storing static information and instructions for the processors 702-706. The system set forth in FIG. 7 is but one possible example of a computer system that may employ or be configured in accordance with aspects of the present disclosure.

According to one embodiment, the above techniques may be performed by computer system 700 in response to processor 704 executing one or more sequences of one or more instructions contained in main memory 716. These instructions may be read into main memory 716 from another machine-readable medium, such as a storage device. Execution of the sequences of instructions contained in main memory 716 may cause processors 702-706 to perform the process steps described herein. In alternative embodiments, circuitry may be used in place of or in combination with the software instructions. Thus, embodiments of the present disclosure may include both hardware and software components.

A machine readable medium includes any mechanism for storing or transmitting information in a form (e.g., software, processing application) readable by a machine (e.g., a computer). Such media may take the form of, but is not limited to, non-volatile media and volatile media. Non-volatile media includes optical or magnetic disks. Volatile media includes dynamic memory, such as main memory 716. Common forms of machine-readable medium may include, but is not limited to, magnetic storage medium; optical storage medium (e.g., CD-ROM); magneto-optical storage medium; read only memory (ROM); random access memory (RAM); erasable programmable memory (e.g., EPROM and EEPROM); flash memory; or other types of medium suitable for storing electronic instructions.

Embodiments of the present disclosure include various steps, which are described in this specification. The steps may be performed by hardware components or may be embodied in machine-executable instructions, which may be used to cause a general-purpose or special-purpose processor programmed with the instructions to perform the steps. Alternatively, the steps may be performed by a combination of hardware, software and/or firmware.

The description above includes example systems, methods, techniques, instruction sequences, and/or computer program products that embody techniques of the present disclosure. However, it is understood that the described disclosure may be practiced without these specific details. In the present disclosure, the methods disclosed may be implemented as sets of instructions or software readable by a device. Further, it is understood that the specific order or hierarchy of steps in the methods disclosed are instances of example approaches. Based upon design preferences, it is understood that the specific order or hierarchy of steps in the method can be rearranged while remaining within the disclosed subject matter. The accompanying method claims present elements of the various steps in a sample order, and are not necessarily meant to be limited to the specific order or hierarchy presented.

It is believed that the present disclosure and many of its attendant advantages should be understood by the foregoing description, and it should be apparent that various changes may be made in the form, construction and arrangement of the components without departing from the disclosed subject matter or without sacrificing all of its material advantages. The form described is merely explanatory, and it is the intention of the following claims to encompass and include such changes.

While the present disclosure has been described with reference to various embodiments, it should be understood that these embodiments are illustrative and that the scope of the disclosure is not limited to them. Many variations, modifications, additions, and improvements are possible. More generally, embodiments in accordance with the present disclosure have been described in the context of particular implementations. Functionality may be separated or combined in blocks differently in various embodiments of the disclosure or described with different terminology. These and other variations, modifications, additions, and improvements may fall within the scope of the disclosure as defined in the claims that follow.

I claim:

1. A method for operating a telecommunications network comprising a content delivery network (CDN) system, the method comprising:
    receiving a first request, at a first resolver device of the CDN system, wherein the first request is from a requesting device, the first request comprising a first internet protocol (IP) address using a first IP address protocol, and the first IP address being related to the requesting device;
    storing, at the first resolver device of the CDN system, the first IP address related to the requesting device in a database of routing protocol information;
    generating, by the CDN system, an address identifier associated with first request;
    receiving, at a second resolver device of the CDN system, a second request at the CDN system, the second request comprising a second IP address using a second IP address protocol, the second IP address being related to the requesting device, wherein the second IP address protocol is different than the first IP address protocol; and
    correlating the first IP address stored in the database and the second IP address of the requesting device based on the address identifier,
    wherein the first IP address protocol is an Internet Protocol version 6 (IPv6) address and the second IP address protocol is an Internet Protocol version 4 (IPv4) address.

2. The method as recited in claim 1 further comprising: assigning an attribute of the second IP address to the first IP address of the requesting device.

3. The method as recited in claim 1 wherein the database of routing protocol information comprises the attribute of the second IP address.

4. The method as recited in claim 3 wherein the attribute of the second IP address is an estimated geographic location of the requesting device.

5. The method as recited in claim 1 further comprising: transmitting a redirect message to the requesting device, the redirect message comprising an identifier of the first IP address.

6. The method as recited in claim 5 wherein the first request is received at a first telecommunications destination of the telecommunications network and the second request is received at a second telecommunications destination of the telecommunications network.

7. The method as recited in claim 6 wherein the redirect message further comprises the second telecommunications destination of the telecommunications network.

8. The method as recited in claim 7 wherein the first telecommunications destination is associated with a first telecommunications device addressable with a first telecommunications device in the first IP address protocol.

9. The method as recited in claim 8 wherein the second telecommunications destination is associated with a second telecommunications device addressable with a second telecommunications device in the second IP address protocol.

10. A content delivery network (CDN) system comprising first and second resolvers, the CDN system comprising:
    a network communication port to transmit and receive communications over a telecommunications network;
    a processor; and
    a memory device in communication with the processor for storing one or more instructions that, when executed by the processor, cause the CDN system to perform operations of:
    receiving a first request from a domain name system (DNS) device communicatively coupled to a requesting device through the network communication port, the first request comprising a first address in a first address protocol;
    storing the first address from the requesting device in a database of routing protocol information;
    generating an address identifier associated with first request;
    receiving a second request through the network communication port from the domain name system (DNS) device, the second request comprising a second address in a second address protocol, the second address related to the requesting device, wherein the second address protocol is different than the first address protocol; and
    correlating the first address stored in the database and the second address of the requesting device based on the address identifier, wherein the first address protocol is an Internet Protocol version 6 (IPv6) address and the second address protocol is an Internet Protocol version 4 (IPv4) address.

11. The CDN system as recited in claim 10 wherein the one or more instructions further cause the CDN system to perform the operations of:
assigning an attribute of the second address to the first address; and
storing an indication of the assignation of the attribute to the first address in the database.

12. The CDN system as recited in claim 10 wherein the attribute of the second address is an estimated geographic location of the requesting device.

13. The CDN system as recited in claim 10 wherein the one or more instructions further cause the CDN system to perform the operations of:
transmitting a redirect message to the requesting device, the redirect message comprising an identifier of the first address.

14. The CDN system as recited in claim 13 wherein the second request further comprises the identifier of the first address.

15. The CDN system as recited in claim 14 wherein correlating the first address stored in the database and the second address of the requesting device comprises:
obtaining the identifier of the first address from the second request; and
associating the identifier of the first address with the stored first address from the requesting device in the database of routing protocol information.

16. The CDN system as recited in claim 13 wherein the first request is received at a first telecommunications destination of the telecommunications network and the second request is received at a second telecommunications destination of the telecommunications network, the first telecommunications destination and the second telecommunications destination being associated with the CDN system.

17. The CDN system as recited in claim 16 wherein the first telecommunications destination is a network address in the first address protocol and the second telecommunications destination is a network address in the second address protocol.

* * * * *